(12) United States Patent
Tashiro et al.

(10) Patent No.: US 11,927,376 B2
(45) Date of Patent: Mar. 12, 2024

(54) REFRIGERATION CYCLE APPARATUS

(71) Applicant: Mitsubishi Electric Corporation, Tokyo (JP)

(72) Inventors: Yusuke Tashiro, Tokyo (JP); Yasuhide Hayamaru, Tokyo (JP); Masakazu Kondo, Tokyo (JP); Masakazu Sato, Tokyo (JP); Atsushi Kawashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 87 days.

(21) Appl. No.: 17/613,814

(22) PCT Filed: Jul. 25, 2019

(86) PCT No.: PCT/JP2019/029212
§ 371 (c)(1),
(2) Date: Nov. 23, 2021

(87) PCT Pub. No.: WO2021/014640
PCT Pub. Date: Jan. 28, 2021

(65) Prior Publication Data
US 2022/0252314 A1  Aug. 11, 2022

(51) Int. Cl.
*F25B 47/02* (2006.01)
*F24F 11/42* (2018.01)
*F25B 1/00* (2006.01)

(52) U.S. Cl.
CPC ............. *F25B 47/02* (2013.01); *F24F 11/42* (2018.01); *F25B 1/00* (2013.01)

(58) Field of Classification Search
CPC ............. F25B 47/02; F25B 1/00; F24F 11/42
See application file for complete search history.

(56) References Cited

U.S. PATENT DOCUMENTS

2017/0370627 A1* 12/2017 Takenaka ................ F25B 13/00

FOREIGN PATENT DOCUMENTS

| CN | 101140123 A | 3/2008 |
| CN | 107110547 A | 8/2017 |

(Continued)

OTHER PUBLICATIONS

Chang, Air conditioner device and control method thereof, 2017, Full Document (Year: 2017).*

(Continued)

*Primary Examiner* — Nael N Babaa
(74) *Attorney, Agent, or Firm* — POSZ LAW GROUP, PLC (57) ABSTRACT

A refrigeration cycle apparatus includes: a compressor; an indoor heat exchanger; an outdoor heat exchanger including first and second outdoor heat exchangers; a bypass flow passage causing a discharge side of the compressor to communicate with the first or second outdoor heat exchanger; a flow control valve at the bypass flow passage; and a controller performing a heating operation in which the first and second outdoor heat exchangers operate as an evaporator and the indoor heat exchanger operates as a condenser and a simultaneous heating and defrosting operation in which part of refrigerant the compressor discharges is supplied to one of the first and second outdoor heat exchangers through the bypass flow passage, the other of the outdoor heat exchangers operates as an evaporator, the indoor heat exchanger operates as a condenser, and an upper limit frequency of the compressor changes to a value higher than in the heating operation.

6 Claims, 8 Drawing Sheets

(56) References Cited

FOREIGN PATENT DOCUMENTS

| CN | 107152819 A * | 9/2017 | ............ F25B 47/022 |
|---|---|---|---|
| JP | S63-290369 A | 11/1988 | |
| JP | 2008-064381 A | 3/2008 | |
| JP | 4272224 B2 | 6/2009 | |
| JP | 5111142 B2 | 12/2012 | |
| WO | WO-2015118580 A1 * | 8/2015 | ............ F24D 17/02 |
| WO | 2016/113851 A1 | 7/2016 | |
| WO | WO-2017073577 A1 * | 5/2017 | ............ F24F 11/89 |

OTHER PUBLICATIONS

Ito, Refrigeration Device, 2015, Full Document (Year: 2015).*
Kadowaki, Heat Pump Hot Water Supply Device, 2014, Full Document (Year: 2014).*
Office Action dated Sep. 21, 2022 issued in corresponding RU patent application No. 2022103573 (and English translation).
Examination Report dated Oct. 26, 2022 issued in corresponding AU patent application No. 2019457803.
Office Action dated Jun. 16, 2022 issued in corresponding JP Patent Application No. 2021-534510 (and English translation).
International Search Report of the International Searching Authority dated Oct. 8, 2019 for the corresponding International application No. PCT/JP2019/029212 (and English translation).
Office Action dated Dec. 1, 2022 issued in corresponding CN Patent Application No. 201980098226.0 (and English machine translation).

\* cited by examiner

REFRIGERATION CYCLE APPARATUS

CROSS REFERENCE TO RELATED APPLICATION

This application is a U.S. national stage application of PCT/JP2019/029212 filed on Jul. 25, 2019, the contents of which are incorporated herein by reference.

Technical Field

The present disclosure relates to a refrigeration cycle apparatus capable of performing a heating operation and a simultaneous heating and defrosting operation.

Background Art

In the case where a heating operation is performed by a refrigeration cycle apparatus, frost may be formed on an outdoor heat exchanger that operates as an evaporator, and hinder heat exchange at the outdoor heat exchanger. Thus, as is well known, in the case where frost forms on the outdoor heat exchanger, a defrosting operation is formed to melt the frost formed on the outdoor heat exchanger. Patent Literature 1 proposes a technique in which a defrosting operation and a heating operation are simultaneously performed in order to continue supply of heated air into an indoor space.

More specifically, a refrigeration cycle apparatus disclosed in Patent Literature 1 includes an outdoor heat exchanger that includes a lower-side heat exchanger and an upper-side heat exchanger that are provided an upper side and a lower side, respectively, in a vertical direction. The defrosting operation of the refrigeration cycle apparatus of Patent Literature 1 includes upper-side defrosting in which an indoor heat exchanger operates as a condenser and the upper-side heat exchanger is defrosted and lower-side defrosting in which the indoor heat exchanger operates as a condenser and the lower-side heat exchanger is defrosted. In the upper-side defrosting, the upper-side heat exchanger operates as a condenser, and the lower-side heat exchanger operates as an evaporator. In the lower-side defrosting, the upper-side heat exchanger operates as an evaporator, and the lower-side heat exchanger operates as a condenser. In such a manner, in Patent Literature 1, the indoor heat exchanger operates as a condenser in both the upper-side defrosting and the lower-side defrosting, and thus even when the defrosting operation is performed, heated air can be supplied into the indoor space.

Citation List

Patent Literature

Patent Literature 1: Japanese Patent No. 4,272,224

SUMMARY OF INVENTION

Technical Problem

As described in Patent Literature 1, in the case where the heating operation and the defrosting operation are simultaneously performed, the indoor heat exchanger and part of the outdoor heat exchanger are caused to operate as a condenser, and a heating load is thus increased, as compared with the case where only the heating operation is performed. As a result, the heating performance of the indoor heat exchanger may lower, and the comfort for the user may be impaired.

The present disclosure is applied to attain an object that is to improve the heating performance of an indoor heat exchanger in a refrigeration cycle apparatus in which part of an outdoor heat exchanger is caused to operate as a condenser and a simultaneous heating and defrosting operation is performed.

Solution to Problem

A refrigeration cycle apparatus according to an embodiment of the present disclosure includes: a compressor; an indoor heat exchanger; an outdoor heat exchanger including a first outdoor heat exchanger and a second outdoor heat exchanger; a bypass flow passage configured to cause a discharge side of the compressor to communicate with the first outdoor heat exchanger or the second outdoor heat exchanger; a flow control valve provided at the bypass flow passage; and a controller configured to perform a heating operation and a simultaneous heating and defrosting operation, the heating operation being an operation in which the first outdoor heat exchanger and the second outdoor heat exchanger are each caused to operate as an evaporator and the indoor heat exchanger is caused to operate as a condenser, the simultaneous heating and defrosting operation being an operation in which part of refrigerant discharged from the compressor is supplied to one of the first outdoor heat exchanger and the second outdoor heat exchanger through the bypass flow passage, the other of the first outdoor heat exchanger and the second outdoor heat exchanger is caused to operate as an evaporator, and the indoor heat exchanger is caused to operate as a condenser. When the simultaneous heating and defrosting operation is performed, the controller changes an upper limit frequency of the compressor to a value higher than the upper limit frequency of the compressor in the heating operation.

Advantageous Effects of Invention

According to an embodiment of the present disclosure, the heating performance of the indoor heat exchanger in the simultaneous heating and defrosting operation can be improved by changing, in the case where the simultaneous heating and defrosting operation is performed, the upper limit frequency of the compressor to a value higher than an upper limit frequency of the compressor that is used in the heating operation.

Description of Embodiments

Embodiment 1

Figure 1:
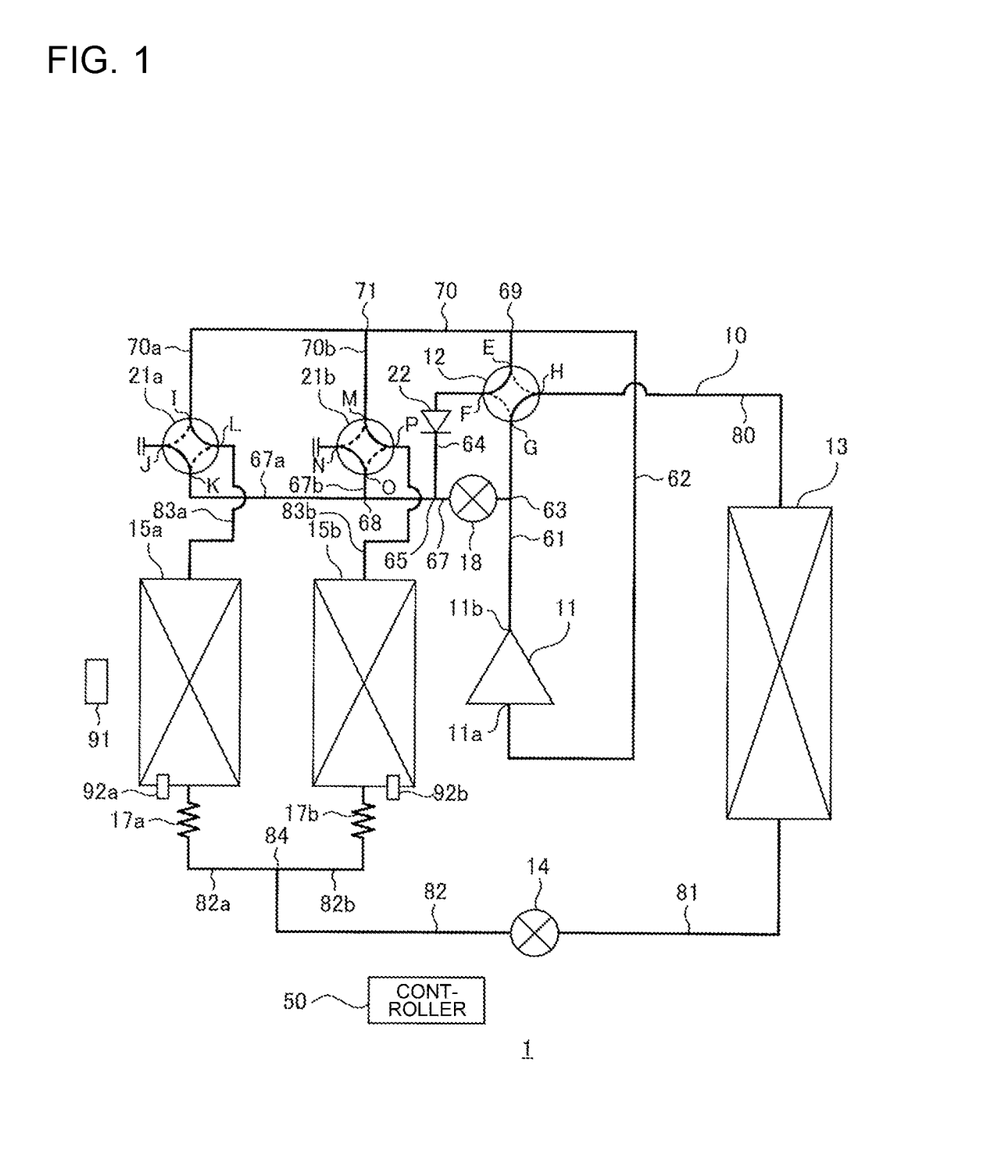
FIG. 1 is a refrigerant circuit diagram illustrating a configuration of a refrigeration cycle apparatus according to Embodiment 1.

A refrigeration cycle apparatus 1 according to Embodiment 1 will be described. FIG. 1 is a refrigerant circuit diagram illustrating a configuration of the refrigeration cycle apparatus 1 according to Embodiment 1. In Embodiment 1, the refrigeration cycle apparatus 1 is an air-conditioning apparatus, but this is merely an example. As illustrated in FIG. 1, the refrigeration cycle apparatus 1 according to Embodiment 1 includes a refrigerant circuit 10 and a controller 50 that controls the refrigerant circuit 10. The refrigerant circuit 10 according to Embodiment 1 includes a compressor 11, a first flow switch valve 12, an indoor heat exchanger 13, an expansion valve 14, a first outdoor heat exchanger 15a, a second outdoor heat exchanger 15b, a second flow switch valve 21a, and a third flow switch valve 21b. As will be described later, the refrigerant circuit 10 is capable of performing at least a heating operation, a reverse cycle defrosting operation (hereinafter simply referred to as "defrosting operation"), and a simultaneous heating and defrosting operation. The refrigerant circuit 10 may also be capable of performing a cooling operation. In the cooling operation, the first flow switch valve 12, the second flow switch valve 21a, and the third flow switch valve 21b are each set to be in a similar state to that in the defrosting operation.

The refrigeration cycle apparatus 1 includes an outdoor unit installed in an outdoor space and an indoor unit installed in an indoor space. The outdoor unit includes the compressor 11, the first flow switch valve 12, the expansion valve 14, the first outdoor heat exchanger 15a, the second outdoor heat exchanger 15b, the second flow switch valve 21a, and the third flow switch valve 21b. The indoor unit includes the indoor heat exchanger 13.

The compressor 11 is a fluid machine that sucks low-pressure gas refrigerant, compresses the low-pressure gas refrigerant to change into high-pressure gas refrigerant, and discharges the high-pressure gas refrigerant. As the compressor 11, an inverter-driven compressor capable of adjusting an operation frequency is used. In the compressor 11, an operation frequency range is set in advance. The compressor 11 is configured to operate under control by the controller 50 and with an operation frequency that can be changed within the operation frequency range. The compressor 11 has a suction port 11a through which refrigerant is sucked and a discharge port 11b through which compressed refrigerant is discharged. The pressure of the suction port 11a is kept at a suction pressure, that is, a low pressure. The pressure of the discharge port 11b is kept at a discharge pressure, that is, a high pressure.

The first flow switch valve 12 is a four-way valve and has four ports E, F, G, and H. In the following description, the port G, the port E, the port F, and the port H may also be referred to as "first port G", "second port E", "third port F", and "fourth port H", respectively. The first port G is a high pressure port whose pressure is kept at a high pressure in any of the heating operation, the defrosting operation, and the simultaneous heating and defrosting operation. The second port E is a low pressure port whose pressure is kept at a low pressure in any of the heating operation, the defrosting operation, and the simultaneous heating and defrosting operation. The first flow switch valve 12 can be set to be in a first state indicated by solid lines in FIG. 1 and a second state indicated by broken lines in FIG. 1. In the first state, the first port G communicates with the fourth port H, and the second port E communicates with the third port F. In the second state, the first port G communicates with the third port F, and the second port E communicates with the fourth port H. Under the control by the controller 50, in the heating operation and in the simultaneous heating and defrosting operation, the first flow switch valve 12 is set to be in the first state, and in the defrosting operation, the first flow switch valve 12 is set to be in the second state.

The indoor heat exchanger 13 is a heat exchanger configured to perform heat exchange between refrigerant that flows in the heat exchanger and air that is sent by an indoor fan (not illustrated) included in the indoor unit. The indoor heat exchanger 13 operates as a condenser in the heating operation and as an evaporator in the cooling operation.

The expansion valve 14 is a valve that reduces the pressure of refrigerant. As the expansion valve 14, an electronic expansion valve whose opening degree can be adjusted under the control by the controller 50 is used.

The first outdoor heat exchanger 15a and the second outdoor heat exchanger 15b are each a heat exchanger that causes heat exchange between refrigerant that flows in the heat exchanger and air that is sent by an outdoor fan (not illustrated) included in the outdoor unit. The first outdoor heat exchanger 15a and the second outdoor heat exchanger 15b each operate as an evaporator in the heating operation and as a condenser in the cooling operation. The first outdoor heat exchanger 15a and the second outdoor heat exchanger 15b are connected in parallel with each other in the refrigerant circuit 10. The first outdoor heat exchanger 15a and the second outdoor heat exchanger 15b are formed by, for example, dividing a single heat exchanger into an upper portion and a lower portion, respectively. For example, the first outdoor heat exchanger 15a is provided under the second outdoor heat exchanger 15b. In this case, the first outdoor heat exchanger 15a and the second outdoor heat exchanger 15b are also arranged in parallel with each other in the flow of air.

The second flow switch valve 21a is a four-way valve and has four ports I, J, K, and L. In the following description, the port K, the port I, the port L, and the port J may also be referred to as "fifth port K", "sixth port I", "seventh port L", and "eighth port J", respectively. The fifth port K is a high pressure port whose pressure is kept at a high pressure in any of the heating operation, the defrosting operation, and the simultaneous heating and defrosting operation. The sixth port I is a low pressure port whose pressure is kept at a low pressure in any of the heating operation, the defrosting operation, and the simultaneous heating and defrosting operation. The eighth port J is closed so that refrigerant does not leak from the eighth port J. The second flow switch valve 21a can be made in a first state indicated by solid lines in FIG. 1 and a second state indicated by broken lines in FIG. 1. In the first state, the fifth port K communicates with the eighth port J, and the sixth port I communicates with the seventh port L. In the second state, the fifth port K communicates with the seventh port L, and the sixth port I communicates with the eighth port J. Under the control by the controller 50, the second flow switch valve 21a is set to be in the first state in the heating operation, to be in the second state in the defrosting operation, and to be in the first state or the second state in the simultaneous heating and defrosting operation.

The third flow switch valve 21b is a four-way valve and has four ports M, N, 0, and P. In the following description, the port O, the port M, the port P, and the port N may also be referred to as "fifth port O", "sixth port M", "seventh port P", and "eighth port N", respectively. The fifth port O is a high pressure port whose pressure is kept at a high pressure in any of the heating operation, the defrosting operation, and the simultaneous heating and defrosting operation. The sixth port M is a low pressure port whose pressure is kept at a low pressure in any of the heating operation, the defrosting operation, and the simultaneous heating and defrosting operation. The eighth port N is closed so that refrigerant does not leak from the eighth port N. The third flow switch valve 21b can be set in a first state indicated by solid lines in FIG. 1 and a second state indicated by broken lines in FIG. 1. In the first state, the fifth port O communicates with the eighth port N, and the sixth port M communicates with the seventh port P. In the second state, the fifth port O communicates with the seventh port P, and the sixth port M communicates with the eighth port N. Under the control by the controller 50, in the heating operation, the third flow switch valve 21b is set to be in the first state; in the defrosting operation, the third flow switch valve 21b is set to be in the second state; and in the simultaneous heating and defrosting operation, the third flow switch valve 21b is set to be in the first state or the second state as described later.

The first flow switch valve 12, the second flow switch valve 21a, and the third flow switch valve 21b are each a four-way valve that is operated by a differential pressure between pressures on a discharge side and a suction side of the compressor 11. As the first flow switch valve 12, the second flow switch valve 21a, and the third flow switch valve 21b, four-way valves having the same configuration can be used.

The discharge port 11b of the compressor 11 and the first port G of the first flow switch valve 12 are connected by a discharge pipe 61. High-pressure refrigerant discharged from the discharge port 11b of the compressor 11 flows through the discharge pipe 61 in any of the heating operation, the defrosting operation, and the simultaneous heating and defrosting operation. The suction port 11a of the compressor 11 and the second port E of the first flow switch valve 12 are connected by a suction pipe 62. Low-pressure refrigerant to be sucked into the suction port 11a of the compressor 11 flows through the suction pipe 62 in any of the heating operation, the defrosting operation, and the simultaneous heating and defrosting operation.

One of ends of a first high pressure pipe 67 is connected to a bifurcation 63 located at intermediate part of the discharge pipe 61. The other end of the first high pressure pipe 67 branches, at a bifurcation 68, into a first high pressure pipe 67a and a first high pressure pipe 67b. The first high pressure pipe 67a is connected to the fifth port K of the second flow switch valve 21a, which is a high pressure port. The first high pressure pipe 67b is connected to the fifth port O of the third flow switch valve 21b, which is a high pressure port. The first high pressure pipes 67, 67a, and 67b form a bypass flow passage that causes the discharge side of the compressor 11 to communicate with the first outdoor heat exchanger 15a or the second outdoor heat exchanger 15b.

The first high pressure pipe 67 has a bifurcation 65 located between the bifurcation 63 and the bifurcation 68. The bifurcation 65 of the first high pressure pipe 67 and the third port F of the first flow switch valve 12 are connected by a second high pressure pipe 64.

At the first high pressure pipe 67, a bypass expansion valve 18 is provided between the bifurcation 63 and the bifurcation 65. The bypass expansion valve 18 is a flow control valve whose opening degree is controlled by the controller 50 to control the flow rate of refrigerant that flows through the first high pressure pipe 67. The bypass expansion valve 18 is, for example, an electronic expansion valve. The bypass expansion valve 18 also has a function of reducing the pressure of refrigerant. The operation of the bypass expansion valve 18 will be described later.

The second high pressure pipe 64 has a check valve 22. The check valve 22 is configured to allow the refrigerant to flow in a direction from the third port F of the first flow switch valve 12 toward the first high pressure pipe 67 and prevent the refrigerant from flowing in a direction from the first high pressure pipe 67 toward the third port F. Instead of the check valve 22, an on-off valve such as a solenoid valve or a motor operated valve that opens and closes under the control by the controller 50 can be used. An operation that is performed in the case where an on-off valve is used instead of the check valve 22 will be described later.

One of ends of a low pressure pipe 70 is connected to a bifurcation 69 located intermediate part of the suction pipe 62. The other end of the low pressure pipe 70 branches, at a bifurcation 71, into a low pressure pipe 70a and a low pressure pipe 70b. The low pressure pipe 70a is connected to the sixth port I of the second flow switch valve 21a, which is a low pressure port. The low pressure pipe 70b is connected to the sixth port M of the third flow switch valve 21b, which is a low pressure port.

The fourth port H of the first flow switch valve 12 is connected to one of inlet/outlet ports of the indoor heat exchanger 13 by a refrigerant pipe 80. Part of the refrigerant pipe 80 is an extension pipe that connects the outdoor unit and the indoor unit. At the refrigerant pipe 80, a stop valve (not illustrated) is provided at a position closer to the outdoor unit than the extension pipe.

The other inlet/outlet port of the indoor heat exchanger 13 is connected to one of inlet/outlet ports of the expansion valve 14 by a refrigerant pipe 81. Part of the refrigerant pipe 81 is another extension pipe that connects the outdoor unit and the indoor unit. At the refrigerant pipe 81, a stop valve (not illustrated) is provided at a position closer to the outdoor unit than the extension pipe.

One of ends of a refrigerant pipe 82 is connected to the other inlet/outlet port of the expansion valve 14. The other end of the refrigerant pipe 82 branches, at a bifurcation 84, into a refrigerant pipe 82a and a refrigerant pipe 82b. At the refrigerant pipe 82a, a pressure reducing device such as a capillary tube 17a is provided. The refrigerant pipe 82a is connected to one of inlet/outlet ports of the first outdoor heat exchanger 15a. At the refrigerant pipe 82b, a pressure reducing device such as a capillary tube 17b is provided. The refrigerant pipe 82b is connected to one of inlet/outlet ports of the second outdoor heat exchanger 15b. That is, the other inlet/outlet port of the expansion valve 14 is connected to the above one of the inlet/outlet ports of the first outdoor heat exchanger 15a and the above one of the inlet/outlet ports of the second outdoor heat exchanger 15b by the refrigerant pipe 82. The one of the inlet/outlet ports of the first outdoor heat exchanger 15a is connected to the one of the inlet/outlet ports of the second outdoor heat exchanger 15b by the refrigerant pipes 82a and 82b.

The other inlet/outlet port of the first outdoor heat exchanger 15a is connected to the seventh port L of the second flow switch valve 21a by a refrigerant pipe 83a inter. The other inlet/outlet port of the second outdoor heat exchanger 15b is connected to the seventh port P of the third flow switch valve 21b by a refrigerant pipe 83b. At least in the heating operation and in the defrosting operation, in the refrigerant circuit 10, the first outdoor heat exchanger 15a and the second outdoor heat exchanger 15b are connected in parallel with each other.

At a housing of the outdoor unit, an outside-air temperature sensor 91 is provided to detect the temperature of outside air around the outdoor unit. In the case where the outdoor unit is installed indoors, the temperature of outside air means an ambient temperature of the outdoor unit. At the first outdoor heat exchanger 15a, a heat-exchanger temperature sensor 92a is provided to detect the temperature of the first outdoor heat exchanger 15a. At the second outdoor heat exchanger 15b, a heat-exchanger temperature sensor 92b is provided to detect the temperature of the second outdoor heat exchanger 15b. The outside-air temperature sensor 91, the heat-exchanger temperature sensor 92a, and the heat-exchanger temperature sensor 92b are, for example, thermistors. The results of detection by the outside-air temperature sensor 91, the heat-exchanger temperature sensor 92a, and the heat-exchanger temperature sensor 92b are transmitted to the controller 50 and are applied to the control by the controller 50. The refrigerant circuit 10 may also include a temperature sensor or a pressure sensor other than the above sensors.

Figure 2:
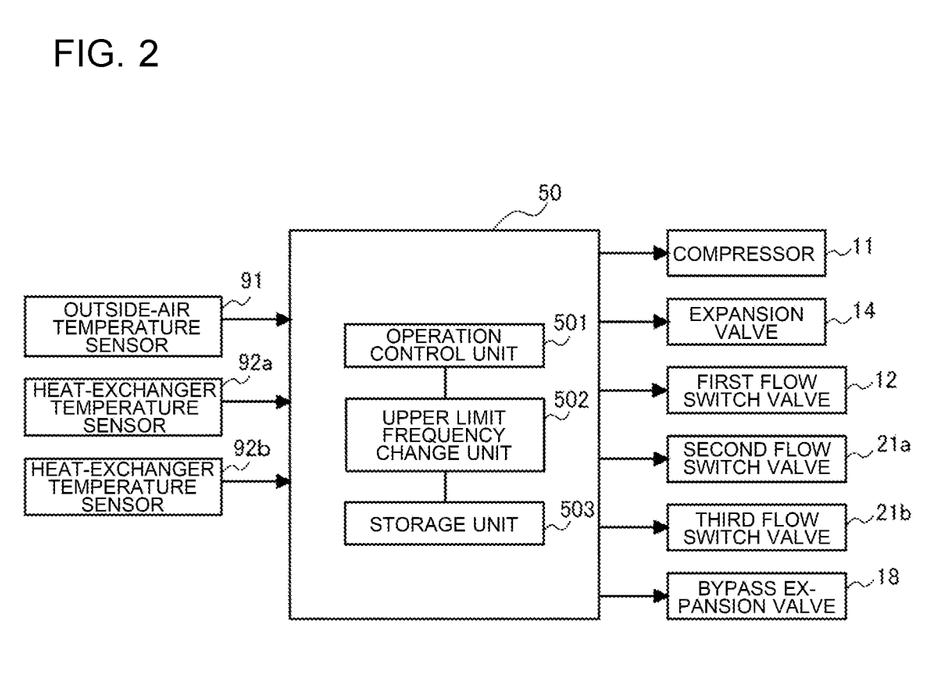
FIG. 2 is a functional block diagram of a controller according to Embodiment 1.

The controller 50 includes a microcomputer that is provided with, for example, a central processing unit (CPU), a read-only memory (ROM), a random access memory (RAM), and an input/output (I/O) port. FIG. 2 is a functional block diagram of the controller 50 according to Embodiment 1. As illustrated in FIG. 2, the controller 50 receives the results of detection by the outside-air temperature sensor 91, the heat-exchanger temperature sensor 92a, and the heat-exchanger temperature sensor 92b. The controller 50 may also receive a detection signal from another temperature sensor and another pressure sensor that are provided in the refrigerant circuit 10 and an operation signal from an operation unit that is operated by the user.

The controller 50 includes an operation control unit 501 and an upper limit frequency change unit 502 as functional units that are implemented by executing programs. The controller 50 further includes a storage unit 503 that is a memory such as a ROM or a RAM. The operation control unit 501 controls the operation of the entire refrigeration cycle apparatus 1 on the basis of input signals, and causes the refrigeration cycle apparatus 1 to perform the heating operation, the defrosting operation, or the simultaneous heating and defrosting operation. Specifically, the operation control unit 501 controls the operation frequency of the compressor 11, the opening degree of the expansion valve 14, a switching operation of the first flow switch valve 12, a switching operation of the second flow switch valve 21a, a switching operation of the third flow switch valve 21b, the opening degree of the bypass expansion valve 18, and a fan.

When the simultaneous heating and defrosting operation is performed, the upper limit frequency change unit 502 changes an upper limit frequency of the compressor 11 to a value higher than an upper limit frequency of the compressor 11 in the heating operation. The upper limit frequency of the compressor 11 is the upper limit value of an operation frequency range of the compressor 11. It will be descried later in detail how the upper limit frequency of the compressor 11 is changed. The storage unit 503 stores various kinds of data and programs that are used in processing by the operation control unit 501 and the upper limit frequency change unit 502.

Figure 3:
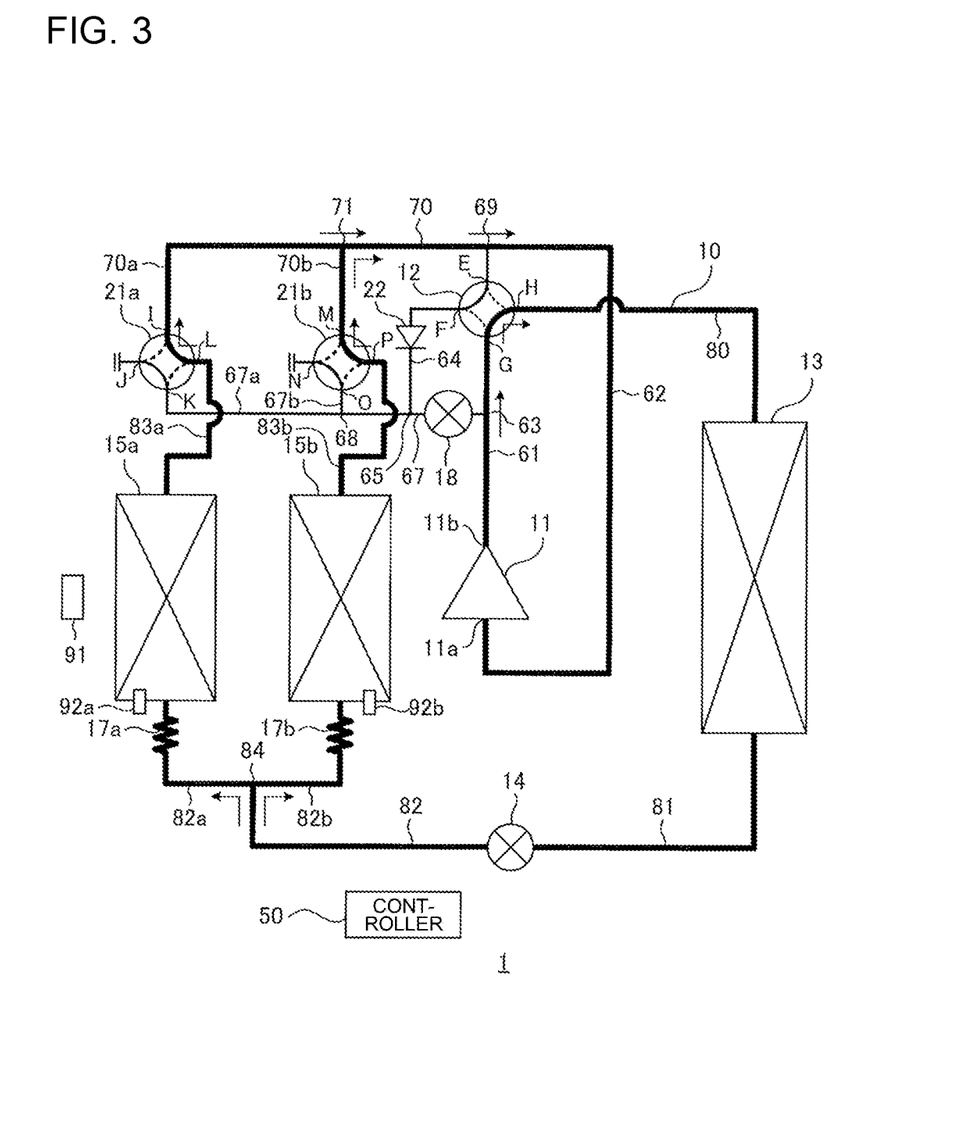
FIG. 3 is a diagram illustrating how the refrigeration cycle apparatus according to Embodiment 1 is operated in a heating operation.

Next, it will be described how the refrigeration cycle apparatus 1 is operated in the heating operation. FIG. 3 is a diagram illustrating how the refrigeration cycle apparatus 1 according to Embodiment 1 is operated in the heating operation. As illustrated in FIG. 3, in the heating operation, the first flow switch valve 12 is set to be in the first state in which the first port G communicates with the fourth port H and the second port E communicates with the third port F. The second flow switch valve 21a is set to be in the first state in which the fifth port K communicates with the eighth port J and the sixth port I communicates with the seventh port L. The third flow switch valve 21b is set to be in the first state in which the fifth port O communicates with the eighth port N and the sixth port M communicates with the seventh port P.

The bypass expansion valve 18 is set to be in an opened state. In this case, the bypass expansion valve 18 is set to be fully opened. When the bypass expansion valve 18 is set to be in the opened state, the pressure of the fifth port K of the second flow switch valve 21a and that of the fifth port O of the third flow switch valve 21b are each kept at a high pressure or an intermediate pressure. In this case, the intermediate pressure is a pressure that is higher than the suction pressure of the compressor 11 and lower than the discharge pressure of the compressor 11. In the case where the bypass expansion valve 18 is set to be in the opened state, an end side of the first high pressure pipe 67 is closed by the eighth port J of the second flow switch valve 21a and the eighth port N of the third flow switch valve 21b. Thus, the refrigerant does not flow out from the other ports of the second flow switch valve 21a and the third flow switch valve 21b. The bypass expansion valve 18 may be set to be in a closed state. In this case, the pressure of the sixth port I of the second flow switch valve 21a and that of the sixth port M of the third flow switch valve 21b are each kept at a low pressure. Thus, even when the bypass expansion valve 18 is set to be in the closed state, the pressure of the fifth port K of the second flow switch valve 21a is kept at a higher pressure than that of the sixth port I, and the pressure of the fifth port O of the third flow switch valve 21b is kept at a higher pressure than that of the sixth port M.

The flow of the refrigerant in a direction from the first high pressure pipe 67 toward the third port F of the first flow switch valve 12 is blocked by the check valve 22. In the case where an on-off valve is used instead of the check valve 22, the on-off valve is set to be in a closed state. As a result, the flow of refrigerant in the direction from the first high pressure pipe 67 toward the third port F of the first flow switch valve 12 is blocked by the on-off valve.

High-pressure gas refrigerant discharged from the compressor 11 flows into the indoor heat exchanger 13 via the discharge pipe 61, the first flow switch valve 12, and the refrigerant pipe 80. In the heating operation, the indoor heat exchanger 13 operates as a condenser. That is, at the indoor heat exchanger 13, heat exchange is performed between the gas refrigerant that flows in the indoor heat exchanger 13 and indoor air that is sent by the indoor fan, and the heat of condensation of the gas refrigerant is transferred to the indoor air. As a result, the gas refrigerant in the indoor heat exchanger 13 condenses to change into high-pressure liquid refrigerant. The indoor air that is sent by the indoor fan is heated by the heat transferred from the refrigerant.

After flowing out of the indoor heat exchanger 13, the liquid refrigerant flows into the expansion valve 14 via the refrigerant pipe 81. The liquid refrigerant that has flowed into the expansion valve 14 is reduced in pressure to change into low-pressure two-phase refrigerant. After flowing out of the expansion valve 14, the two-phase refrigerant flows through the refrigerant pipe 82 and branches into two-phase refrigerant streams that flow into respective refrigerant pipes, that is, the refrigerant pipe 82a and the refrigerant pipe 82b. The two-phase refrigerant stream that has flowed into the refrigerant pipe 82a is further reduced in pressure at the capillary tube 17a and then flows into the first outdoor heat exchanger 15a. The two-phase refrigerant stream that has flowed into the refrigerant pipe 82b is further reduced in pressure at the capillary tube 17b and then flows into the second outdoor heat exchanger 15b.

In the heating operation, the first outdoor heat exchanger 15a and the second outdoor heat exchanger 15b each operate as an evaporator. That is, in each of the first outdoor heat exchanger 15a and the second outdoor heat exchanger 15b, heat exchange is performed between outdoor air that is sent by the outdoor fan and the two-phase refrigerant that flows in each outdoor heat exchanger, and heat of evaporation of the two-phase refrigerant is absorbed from the outdoor air. As a result, the two-phase refrigerant that has flowed into each of the first outdoor heat exchanger 15a and the second outdoor heat exchanger 15b evaporates to change into low-pressure gas refrigerant.

After flowing out of the first outdoor heat exchanger 15a, the gas refrigerant flows through the refrigerant pipe 83a, the second flow switch valve 21a, the low pressure pipe 70a, the low pressure pipe 70, and the suction pipe 62 and is sucked into the compressor 11. After flowing out of the second outdoor heat exchanger 15b, the gas refrigerant flows through the refrigerant pipe 83b, the third flow switch valve 21b, and the low pressure pipe 70b, joins the gas refrigerant that has flowed out of the first outdoor heat exchanger 15a, and is sucked into the compressor 11. That is, the gas refrigerant that has flowed out of the first outdoor heat exchanger 15a and the gas refrigerant that has flowed out of the second outdoor heat exchanger 15b are sucked into the compressor 11 without flowing through the first flow switch valve 12. The gas refrigerant that has been sucked into the compressor 11 is compressed to change into high-pressure gas refrigerant. In the heating operation, the above cycle is continuously repeated.

In the heating operation, the pressures of the first port G of the first flow switch valve 12, the fifth port K of the second flow switch valve 21a, and the fifth port O of the third flow switch valve 21b are each kept at a high pressure or an intermediate pressure. Furthermore, in the heating operation, the pressures of the second port E of the first flow switch valve 12, the sixth port I of the second flow switch valve 21a, and the sixth port M of the third flow switch valve 21b are each kept at a low pressure.

Figure 4:
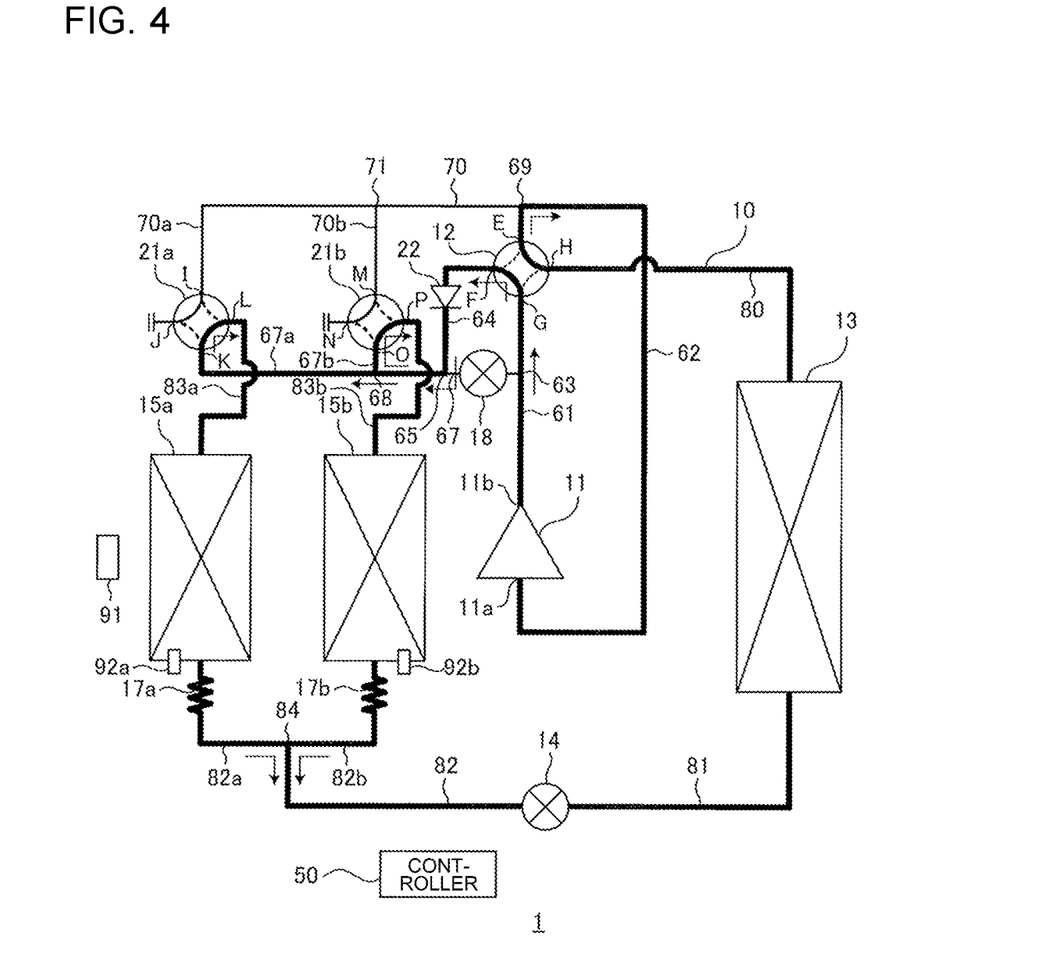
FIG. 4 is a diagram illustrating how the refrigeration cycle apparatus according to Embodiment 1 is operated in a defrosting operation.

Next, it will be described how the refrigeration cycle apparatus 1 is operated in the defrosting operation. FIG. 4 illustrates how the refrigeration cycle apparatus 1 according to Embodiment 1 is operated in the defrosting operation. As illustrated in FIG. 4, in the defrosting operation, the first flow switch valve 12 is set to be in the second state in which the first port G communicates with the third port F and the second port E communicates with the fourth port H. The second flow switch valve 21a is set to be in the second state in which the fifth port K communicates with the seventh port L and the sixth port I communicates with the eighth port J. The third flow switch valve 21b is set to be in the second state in which the fifth port O communicates with the seventh port P and the sixth port M communicates with the eighth port N.

The bypass expansion valve 18 is set to be in the closed state. The check valve 22 allows refrigerant to flow in a direction from the third port F of the first flow switch valve 12 toward the first high pressure pipe 67. In the case where the on-off valve is used instead of the check valve 22, the on-off valve is set to be in the opened state, and thus allows the refrigerant to flow in the direction from the third port F of the first flow switch valve 12 toward the first high pressure pipe 67.

The high-pressure gas refrigerant discharged from the compressor 11 flows through the discharge pipe 61, the first flow switch valve 12, the second high pressure pipe 64, and the first high pressure pipe 67 and branches into high-pressure gas refrigerant streams which flow into respective high pressure pipes, that is, the first high pressure pipe 67a and the first high pressure pipe 67b. The gas refrigerant stream that has flowed into the first high pressure pipe 67a flows into the first outdoor heat exchanger 15a via the second flow switch valve 21a and the refrigerant pipe 83a. The gas refrigerant stream that has flowed into the first high pressure pipe 67b flows into the second outdoor heat exchanger 15b via the third flow switch valve 21b and the refrigerant pipe 83b. In the defrosting operation, the first outdoor heat exchanger 15a and the second outdoor heat exchanger 15b each operate as a condenser. That is, at the first outdoor heat exchanger 15a and the second outdoor heat exchanger 15b, heat transferred from the refrigerant streams that flow in the first outdoor heat exchanger 15a and the second outdoor heat exchanger 15b melts frost formed on the first outdoor heat exchanger 15a and the second outdoor heat exchanger 15b, respectively. As a result, the first outdoor heat exchanger 15a and the second outdoor heat exchanger 15b are defrosted. The gas refrigerant streams that have flowed into the first outdoor heat exchanger 15a and the second outdoor heat exchanger 15b condense to change into liquid refrigerant.

After flowing out of the first outdoor heat exchanger 15a, the liquid refrigerant is reduced in pressure at the capillary tube 17a and flows into the expansion valve 14 via the refrigerant pipe 82a and the refrigerant pipe 82. After flowing out of the second outdoor heat exchanger 15b, the liquid refrigerant is reduced in pressure at the capillary tube 17b, flows through the refrigerant pipe 82b, joins the liquid refrigerant that has flowed out of the first outdoor heat exchanger 15a, and flows into the expansion valve 14. The liquid refrigerant that has flowed into the expansion valve 14 is reduced in pressure to change into low-pressure two-phase refrigerant. After flowing out of the expansion valve 14, the two-phase refrigerant flows into the indoor heat exchanger 13 via the refrigerant pipe 81. In the defrosting operation, the indoor heat exchanger 13 operates as an evaporator. That is, in the indoor heat exchanger 13, heat of evaporation of the refrigerant that flows in the indoor heat exchanger 13 is absorbed from indoor air. As a result, the two-phase refrigerant in the indoor heat exchanger 13 evaporates to change into low-pressure gas refrigerant. After flowing out of the indoor heat exchanger 13, the gas refrigerant flows through the refrigerant pipe 80, the first flow switch valve 12, and the suction pipe 62, and is sucked into the compressor 11. The gas refrigerant that has been sucked into the compressor 11 is compressed to change into high-pressure gas refrigerant. In the defrosting operation, the above cycle is continuously repeated.

In the defrosting operation, the pressures of the first port G of the first flow switch valve 12, the fifth port K of the second flow switch valve 21a, and the fifth port O of the third flow switch valve 21b are each kept at a high pressure. Furthermore, in the defrosting operation, the pressures of the second port E of the first flow switch valve 12, the sixth port I of the second flow switch valve 21a, and the sixth port M of the third flow switch valve 21b are each kept at a low pressure.

Figure 5:
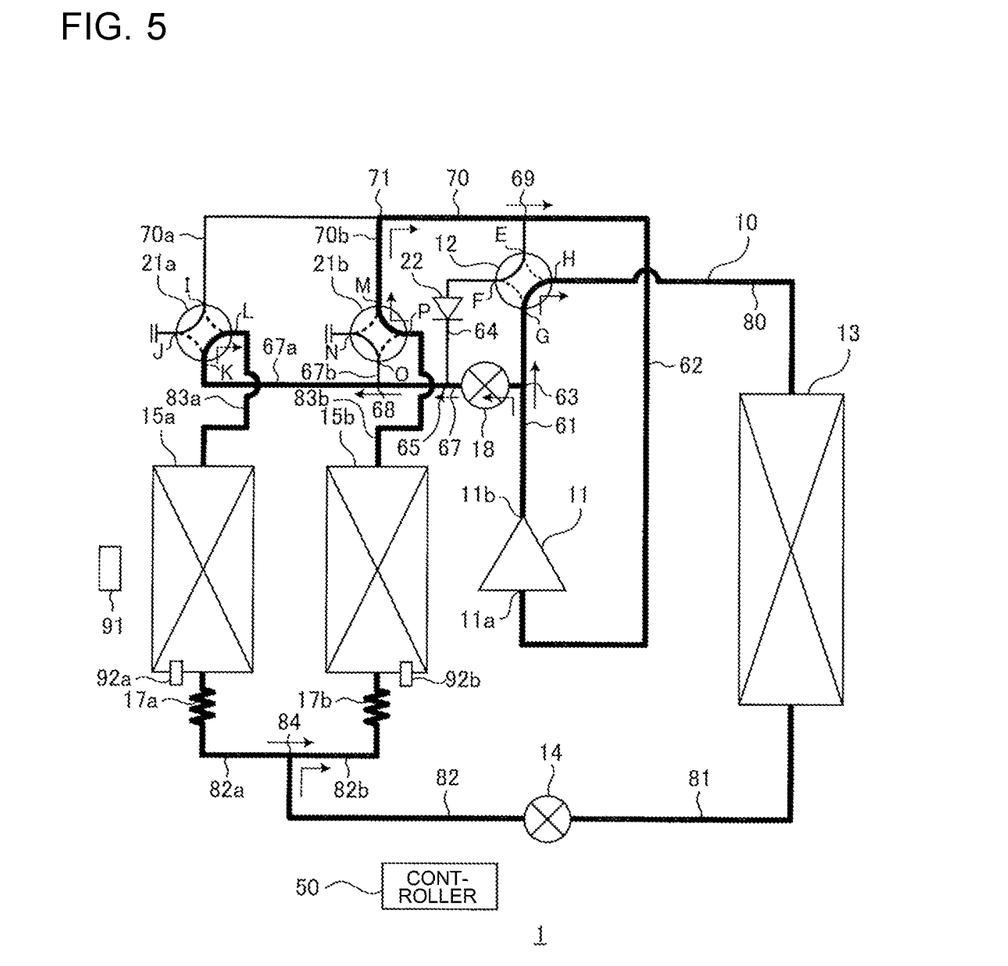
FIG. 5 is a diagram illustrating how the refrigeration cycle apparatus according to Embodiment 1 is operated in a first operation in a simultaneous heating and defrosting operation.

Next, it will be described how the refrigeration cycle apparatus 1 is operated in the simultaneous heating and defrosting operation. The simultaneous heating and defrosting operation includes a first operation and a second operation. In the first operation, the first outdoor heat exchanger 15a and the indoor heat exchanger 13 each operate as a condenser, and the second outdoor heat exchanger 15b operates as an evaporator. As a result, the first outdoor heat exchanger 15a is defrosted while heating is continuing. In the second operation, the second outdoor heat exchanger 15b and the indoor heat exchanger 13 each operate as a condenser, and the first outdoor heat exchanger 15a operates as an evaporator. As a result, the second outdoor heat exchanger 15b is defrosted while heating is continuing. FIG. 5 is a diagram illustrating how the refrigeration cycle apparatus 1 according to Embodiment 1 is operated in the first operation in the simultaneous heating and defrosting operation.

As illustrated in FIG. 5, in the first operation, the first flow switch valve 12 is set to be in the first state in which the first port G communicates with the fourth port H and the second port E communicates with the third port F; the second flow switch valve 21a is set to be in the second state in which the fifth port K communicates with the seventh port L and the sixth port I communicates with the eighth port J; and the third flow switch valve 21b is set to be in the first state in which the fifth port O communicates with the eighth port N and the sixth port M communicates with the seventh port P.

The bypass expansion valve 18 is set to be in the opened state and the opening degree of the bypass expansion valve 18 is set to a predetermined opening degree. The flow of refrigerant in the direction from the first high pressure pipe 67 toward the third port F of the first flow switch valve 12 is blocked by the check valve 22. In the case where the on-off valve is used instead of the check valve 22, the on-off valve is set to be in the closed state, and thus blocks the flow of refrigerant in the direction from the first high pressure pipe 67 toward the third port F of the first flow switch valve 12.

The high-pressure gas refrigerant discharged from the compressor 11 branches off, as a result of which part of the high-pressure gas refrigerant flows from the discharge pipe 61 into the first high pressure pipe 67. The pressure of the gas refrigerant that has flowed into the first high pressure pipe 67 is reduced to an intermediate pressure at the bypass expansion valve 18, and the refrigerant then flows into the first outdoor heat exchanger 15a via the first high pressure pipe 67a, the second flow switch valve 21a, and the refrigerant pipe 83a. At the first outdoor heat exchanger 15a, heat transferred from the refrigerant that flows in the first outdoor heat exchanger 15a melts frost formed on the first outdoor heat exchanger 15a. As a result, the first outdoor heat exchanger 15a is defrosted. The gas refrigerant in the first outdoor heat exchanger 15a condenses to change into intermediate-pressure liquid refrigerant or two-phase refrigerant. The intermediate-pressure liquid refrigerant or two-phase refrigerant flows out from the first outdoor heat exchanger 15a, and is reduced in pressure at the capillary tube 17a.

Of the high-pressure gas refrigerant discharged from the compressor 11, high-pressure gas refrigerant other than the high-pressure gas refrigerant that has been flowed into the first high pressure pipe 67 flows into the indoor heat exchanger 13 via the first flow switch valve 12 and the refrigerant pipe 80. In the indoor heat exchanger 13, heat exchange is performed between the gas refrigerant that flows in the indoor heat exchanger 13 and indoor air that is sent by the indoor fan, and the heat of condensation of the gas refrigerant is transferred to the indoor air. As a result, the gas refrigerant in the indoor heat exchanger 13 condenses to change into high-pressure liquid refrigerant. The indoor air that is sent by the indoor fan is heated by heat transferred from the refrigerant.

After flowing out of the indoor heat exchanger 13, the liquid refrigerant flows into the expansion valve 14 via the refrigerant pipe 81. The liquid refrigerant that has flowed into the expansion valve 14 is reduced in pressure to change into low-pressure two-phase refrigerant. After flowing out of the expansion valve 14, the two-phase refrigerant flows through the refrigerant pipe 82, joins the liquid refrigerant or two-phase refrigerant that has been reduced in pressure at the capillary tube 17a, is further reduced in pressure at the capillary tube 17b, and flows into the second outdoor heat exchanger 15b. In the second outdoor heat exchanger 15b, heat exchange is performed between the refrigerant that flows in the second outdoor heat exchanger 15b and outdoor air that is sent by the outdoor fan, and heat of evaporation of the refrigerant is absorbed from the outdoor air. As a result, the two-phase refrigerant that has flowed into the second outdoor heat exchanger 15b evaporates to change into low-pressure gas refrigerant. After flowing out of the second outdoor heat exchanger 15b, the gas refrigerant flows through the refrigerant pipe 83b, the third flow switch valve 21b, the low pressure pipe 70b, the low pressure pipe 70, and the suction pipe 62, and is sucked into the compressor 11. That is, the gas refrigerant that has flowed out of the second outdoor heat exchanger 15b is sucked into the compressor 11 without flowing through the first flow switch valve 12. The gas refrigerant that has been sucked into the compressor 11 is compressed to change into high-pressure gas refrigerant. In the first operation of the simultaneous heating and defrosting operation, the above cycle is continuously repeated, whereby the first outdoor heat exchanger 15a is defrosted while heating is continuing.

In the first operation of the simultaneous heating and defrosting operation, the pressures of the first port G of the first flow switch valve 12, the fifth port K of the second flow switch valve 21a, and the fifth port O of the third flow switch valve 21b are each kept at a high pressure or an intermediate pressure. In the first operation, the pressures of the second port E of the first flow switch valve 12, the sixth port I of the second flow switch valve 21a, and the sixth port M of the third flow switch valve 21b are each kept at a low pressure.

Figure 6:
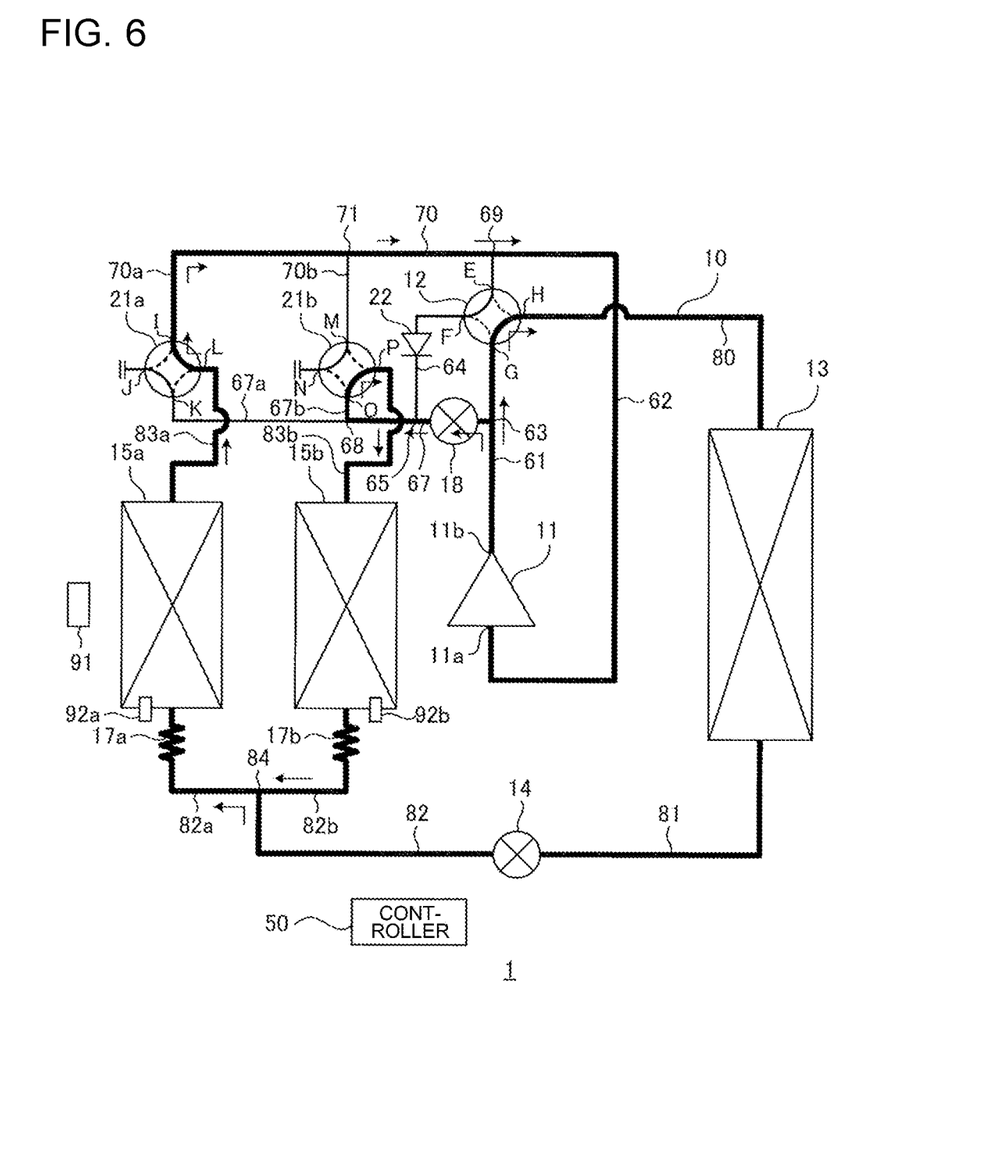
FIG. 6 is a diagram illustrating how the refrigeration cycle apparatus according to Embodiment 1 is operated in a second operation in the simultaneous heating and defrosting operation.

FIG. 6 is a diagram illustrating how the refrigeration cycle apparatus 1 according to Embodiment 1 is operated in the second operation in the simultaneous heating and defrosting operation. As illustrated in FIG. 6, in the second operation of the simultaneous heating and defrosting operation, the second flow switch valve 21a is set to be in the first state, and the third flow switch valve 21b is set to be in the second state. In this regard, the second operation is opposite to the first operation. The first flow switch valve 12 and the bypass expansion valve 18 are set to be in the same states as those in the first operation. As a result, in the second operation, the second outdoor heat exchanger 15b is defrosted while heating is continuing. In the second operation, the pressures of the first port G of the first flow switch valve 12, the fifth port K of the second flow switch valve 21a, and the fifth port O of the third flow switch valve 21b are each kept at a high pressure or an intermediate pressure. Furthermore, in the second operation, the pressures of the second port E of the first flow switch valve 12, the sixth port I of the second flow switch valve 21a, and the sixth port M of the third flow switch valve 21b are each kept at a low pressure.

Next, it will be described how the upper limit frequency of the compressor 11 is changed by the upper limit frequency change unit 502. The upper limit frequency of the compressor 11 is set such that a pressure, a discharge refrigerant temperature, and an electric current value of the compressor 11 do not reach protection values. In this case, in the heating operation, the discharge refrigerant temperature of the compressor 11 is controlled using the expansion valve 14 to reach a target temperature. In the heating operation, a temperature range is lower than that in the defrosting operation, and thus the pressure of the compressor 11 does not easily reach its protection value. Thus, in the heating operation, the upper limit frequency of the compressor 11 is affected mainly by the electric current value. The electric current value is determined by all inputs to the refrigeration cycle apparatus 1, and an input W to the compressor 11 holds the majority of all the inputs. The input W to the compressor 11 can be obtained by the following Equation (1).

$$W = Gr \times dH \quad (1)$$

In Equation (1), Gr is a flow rate of the refrigerant, and dH is an enthalpy difference between the suction side and the discharge side of the compressor 11. As indicated in Equation (1), the input W to the compressor 11 is proportional to the flow rate Gr of the refrigerant. The flow rate Gr of the refrigerant can be obtained by the following Equation (2).

$$Gr = f \times \rho \times Vst \times \eta v \quad (2)$$

In Equation (2), f is the operation frequency of the compressor 11, ρ is the suction density of the compressor 11, Vst is the stroke volume of the compressor 11, and ηv is the volumetric efficiency of the compressor 11. As indicated in Equation (2), the flow rate Gr of the refrigerant is proportional to the suction density ρ of the compressor 11. It should be noted that the stroke volume Vst and the volumetric efficiency ηv are fixed values and are determined by the specifications of the compressor 11.

The usage of the outdoor heat exchanger in the heating operation is different from that in the simultaneous heating and defrosting operation. Specifically, in the heating operation, the first outdoor heat exchanger 15a and the second outdoor heat exchanger 15b each operate as an evaporator, whereas in the simultaneous heating and defrosting operation, only one of the first outdoor heat exchanger 15a and the second outdoor heat exchanger 15b operates as an evaporator. Thus, even when the operation frequency f of the compressor 11 and the volume of air from the outdoor fan (not illustrated) in the heating operation are the same as those in the simultaneous heating and defrosting operation, the evaporation pressure in the heating operation is different from that in the simultaneous heating and defrosting operation, and the suction pressure (low pressure) of the compressor 11 in the simultaneous heating and defrosting operation is lower than that in the heating operation.

The suction density ρ of the compressor 11 is proportional to the suction pressure, and the lower the suction pressure, the smaller the suction density ρ. As is clear from Equation (2), when the operation frequency f of the compressor 11 is fixed, the smaller the suction density ρ, the lower the flow rate Gr of the refrigerant. As a result, in the simultaneous heating and defrosting operation, the input W to the compressor 11 decreases as the flow rate Gr of the refrigerant decreases. Thus, it can be seen that even in the case where the operation frequency f of the compressor 11 reaches its protection value in the heating operation, the operation frequency f of the compressor 11 does not reach its protection value in the simultaneous heating and defrosting operation.

Thus, the upper limit frequency of the compressor 11 in the simultaneous heating and defrosting operation can be set higher than that in the heating operation. The upper limit frequency change unit 502 thus changes the upper limit frequency of the compressor 11 in the simultaneous heating and defrosting operation to a value higher than that in the heating operation.

The value by which the upper limit frequency of the compressor 11 in the simultaneous heating and defrosting operation is increased will be described. It should be noted that in the following description, the upper limit frequency of the compressor 11 in the simultaneous heating and defrosting operation is referred to "upper limit frequency fmod", and the upper limit frequency of the compressor 11 in the heating operation is referred to as "upper limit frequency fmh"; and the first outdoor heat exchanger 15a and the second outdoor heat exchanger 15b are collectively referred to "outdoor heat exchanger".

In the case where the performance of the first outdoor heat exchanger 15a is equivalent to that of the second outdoor heat exchanger 15b, the performance of an evaporator in the simultaneous heating and defrosting operation is half the performance of the entire outdoor heat exchanger. In this case, when a temperature difference Δdeg between the outside-air temperature and the evaporating temperature at the outdoor heat exchanger in the heating operation is 5 deg, the temperature difference Δdeg in the simultaneous heating and defrosting operation is 10 deg, which is double the temperature difference Δdeg in the heating operation. When the outside-air temperature is 2 degrees C. and refrigerant to be used is R32, the gas density of refrigerant saturated gas in the case where the temperature difference Δdeg is 5 deg is 20.04 kg/m³, and the gas density of refrigerant saturated gas in the case where the temperature difference Δdeg is 10 deg is 16.98 kg/m³. As a result, the speed multiplying factor of the compressor 11 is 1/0.85 and is thus approximately 1.2.

Even when the outside-air temperature is −5 degrees C., the speed multiplying factor of the compressor 11 is nearly equal to that in the case where the outside-air temperature is 5 degrees C. and is approximately 1.2. Thus, in the case where the outdoor heat exchanger is divided into two portions, which are the first outdoor heat exchanger 15a and the second outdoor heat exchanger 15b, the multiplying factor of the upper limit frequency of the compressor 11 can be set to 1.2. Actually, the maximum multiplying factor of the upper limit frequency of the compressor 11 is set to 1.2. That is, the upper limit frequency fmod of the compressor 11 in the simultaneous heating and defrosting operation is set, at maximum, 1.2 times higher than the upper limit frequency fmh in the heating operation. The upper limit frequency fmod in the simultaneous heating and defrosting operation is stored in advance as data in the storage unit 503 of the controller 50. By setting, in the above manner, the value by which the upper limit frequency of the compressor 11 in the simultaneous heating and defrosting operation is increased, even when the upper limit frequency of the compressor 11 in the simultaneous heating and defrosting operation is set higher than that in the heating operation, the value of the input W to the compressor 11 can be made equal to that in the heating operation.

Figure 7:
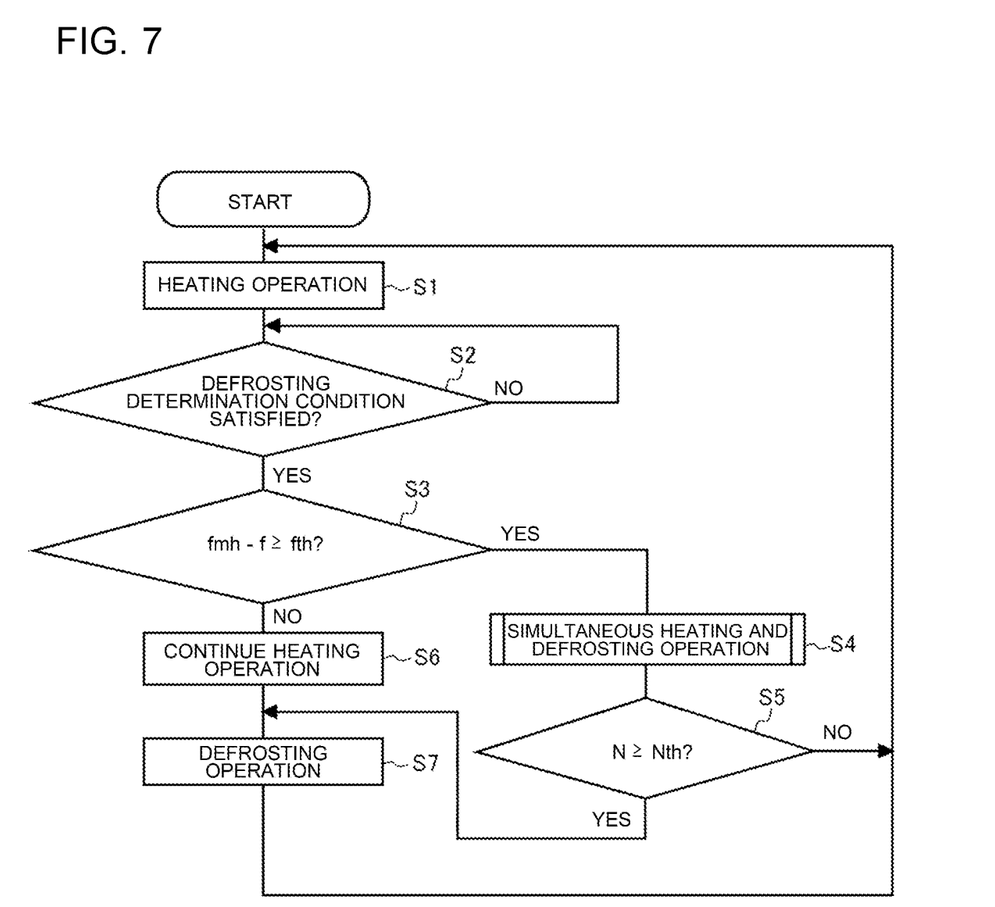
FIG. 7 is a flow chart indicating a sequence of steps in the operation of the refrigeration cycle apparatus according to Embodiment 1.

FIG. 7 is a flow chart indicating a sequence of steps in the operation of the refrigeration cycle apparatus 1 according to Embodiment 1. The operation control unit 501 of the controller 50 starts the heating operation on the basis of, for example, a heating operation start signal from the operation unit (S1). When the heating operation is started, the operation control unit 501 determines whether a defrosting determination condition is satisfied or not (S2). The defrosting determination condition is that, for example, time that elapses from the start of the heating operation exceeds a threshold time period (for example, 20 minutes). In the case where it is determined that the defrosting determination condition is satisfied (YES in S2), the process proceeds to the process of step S3. In the case where it is determined that the defrosting determination condition is not satisfied (NO in S2), the process of step S2 is periodically repeated.

In step S3, the operation control unit 501 acquires, as the operation frequency f, the value of the operation frequency of the compressor 11 at the present time or the average value of operation frequencies of the compressor 11 for a time period from the start of the heating operation to the present time. Thereafter, the controller 50 determines whether a frequency difference (fmh−f) is greater than or equal to a threshold fth, the frequency difference being a value obtained by subtracting the operation frequency f from the upper limit frequency fmh of the compressor 11 (S3). The upper limit frequency fmh and the threshold fth are pre-stored as data in the storage unit 503 of the controller 50. The compressor 11 is controlled such that the heavier the heating load, the higher the operation frequency, and thus the operation frequency of the compressor 11 is substantially proportional to the heating load.

In the case where the value obtained by subtracting the operation frequency f from the upper limit frequency fmh is greater than or equal to the threshold fth (fmh−f≥fth) (YES in S3), the process proceeds to the process of step S4. In contrast, in the case where the value obtained by subtracting the operation frequency f from the upper limit frequency fmh is smaller than the threshold fth (fmh−f<fth) (NO in S3), the process proceeds to the process of step S6.

In step S4, the simultaneous heating and defrosting operation is performed (S4). In this case, the operation control unit 501 includes a counter that stores the number of times N the simultaneous heating and defrosting operation is performed. The initial value of the counter is zero. In the case where the simultaneous heating and defrosting operation has been performed, the operation control unit 501 adds 1 to the number of times N that is stored as data in the counter.

Figure 8:
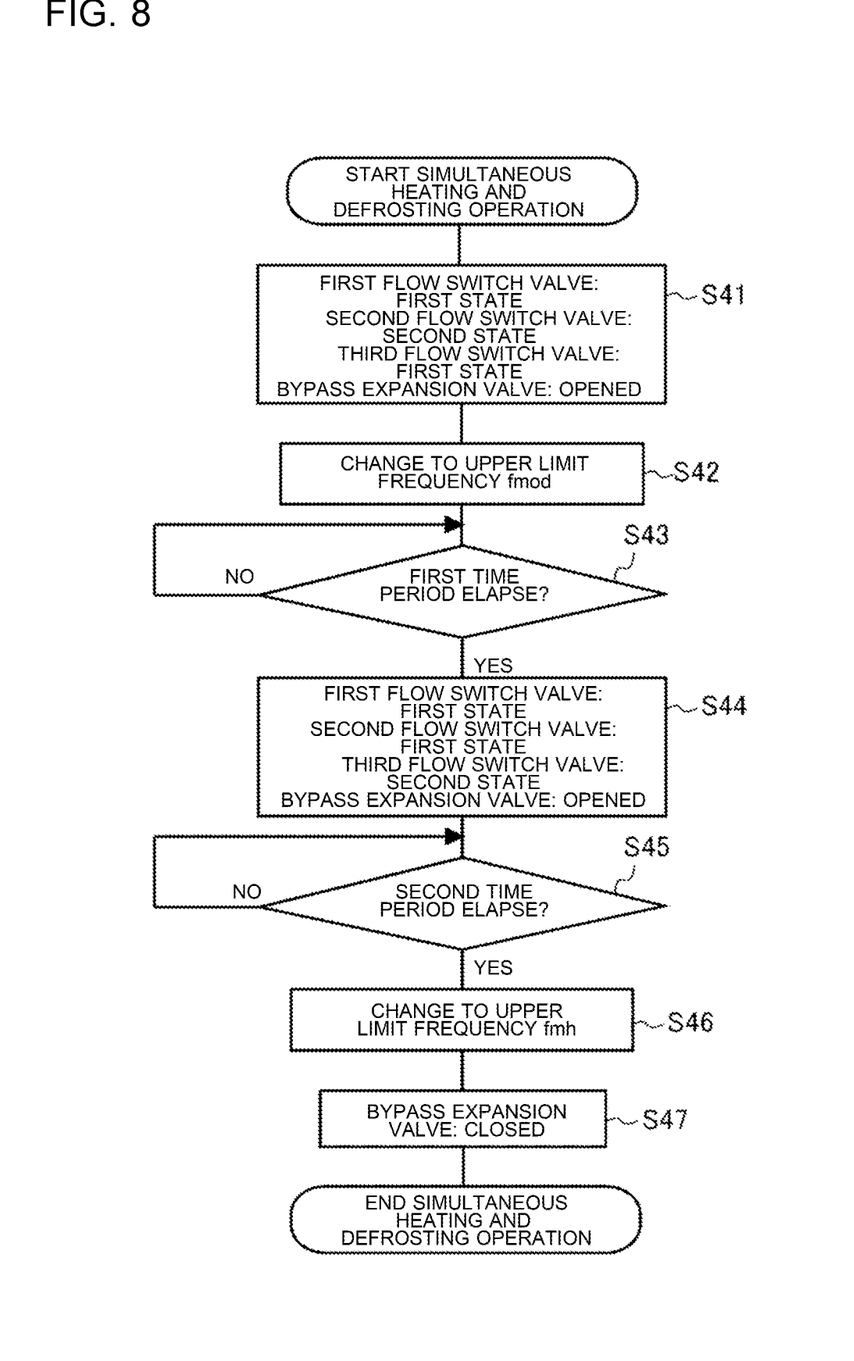
FIG. 8 is a flow chart indicating a sequence of steps in the simultaneous heating and defrosting operation of the refrigeration cycle apparatus according to Embodiment 1.

FIG. 8 is a flow chart indicating a sequence of steps in the simultaneous heating and defrosting operation of the refrigeration cycle apparatus 1 according to Embodiment 1. When the simultaneous heating and defrosting operation is started, first, the first flow switch valve 12 is set to be in the first state, the second flow switch valve 21a is set to be in the second state, and the third flow switch valve 21b is set to be in the first state, in order to perform the first operation to defrost the first outdoor heat exchanger 15a. The bypass expansion valve 18 is set to be in an opened state such that the opening degree of the bypass expansion valve 18 is set to the predetermined opening degree (S41).

Subsequently, the upper limit frequency of the compressor 11 is changed by the upper limit frequency change unit 502 of the controller 50 to the upper limit frequency fmod in the simultaneous heating and defrosting operation (S42).

The upper limit frequency fmod in the simultaneous heating and defrosting operation is higher than the upper limit frequency fmh in the heating operation and is, for example, 1.2 times higher than the upper limit frequency fmh in the heating operation. Since the upper limit frequency of the compressor 11 is changed after the switching operations of the first flow switch valve 12, the second flow switch valve 21a, the third flow switch valve 21b, and the bypass expansion valve 18 are performed, the upper limit frequency of the compressor 11 can be prevented from being increased to reach its protection value in the heating operation before the switching operations.

The first operation is performed until a predetermined first time period elapses (NO in S43). When the first operation is started, the first outdoor heat exchanger 15a operates as a condenser, and the heating load thus increases. The compressor 11 is controlled such that the heavier the heating load, the higher the operation frequency. Thus, the control is performed such that the operation frequency f of the compressor 11 in the simultaneous heating and defrosting operation is set higher than that in the heating operation. It should be noted that in Embodiment 1, since the upper limit frequency of the compressor 11 is changed to the upper limit frequency fmod, which is higher than the upper limit frequency fmh in the heating operation, the operation frequency of the compressor 11 can be set higher than that in the heating operation, and the heating performance of the indoor heat exchanger 13 can be improved. As a result, the amount of heated air that is supplied to the indoor unit in the simultaneous heating and defrosting operation can be made close to the amount of heated air that is supplied in the heating operation, and the comfort for the user can thus be maintained.

When the predetermined first time period elapses (YES in S43), the second flow switch valve 21a is set to be in the first state, the third flow switch valve 21b is set to be in the second state (S44), and the second operation to defrost the second outdoor heat exchanger 15b is performed. In the second operation, the first flow switch valve 12 and the bypass expansion valve 18 are set to be in the same states as those in the first operation. In the second operation, since the upper limit frequency fmod of the compressor 11 is also set higher than the upper limit frequency fmh in the heating operation, it is possible to improve the heating performance of the indoor heat exchanger 13, and maintain the comfort for the user.

The second operation is performed until a predetermined second time period elapses (NO in S45). The second time period may be equal to the first time period or set to a time period different from the first time period. When the predetermined second time period elapses (YES in S45), the upper limit frequency of the compressor 11 is changed to the upper limit frequency fmh in the heating operation by the upper limit frequency change unit 502 (S46). That is, in the case where the simultaneous heating and defrosting operation ends, the upper limit frequency change unit 502 changes the upper limit frequency of the compressor 11 to the upper limit frequency fmh, which is lower than the upper limit frequency fmod, that is, upper limit frequency in the simultaneous heating and defrosting operation. The bypass expansion valve 18 is then set to be in the closed state (S47), and the simultaneous heating and defrosting operation ends.

Returning to FIG. 7, the operation control unit 501 determines whether the number of times N the simultaneous heating and defrosting operation is performed is larger than or equal to a threshold Nth that is the threshold number of times (S5). In the case where the number of times N is larger than or equal to the threshold Nth (N≥Nth) (YES in S5), the process proceeds to the process of step S7. Before the process proceeds to the process of step S7, the heating operation may be performed. In contrast, in the case where the number of times N is smaller than the threshold Nth (N<Nth) (NO in S5), the process returns to the process of step S1, and the heating operation is restarted.

In step S6, the operation control unit 501 further continues the heating operation for a predetermined time period. Thereafter, the process proceeds to the process of step S7. In step S7, the controller 50 terminates the heating operation or the simultaneous heating and defrosting operation and performs the defrosting operation for a predetermined time period. Generally, a time period in which the defrosting operation is performed is shorter than the sum of the first time period and the second time period of the simultaneous heating and defrosting operation. Furthermore, the operation control unit 501 controls the compressor 11 to cause the operation frequency f of the compressor 11 in the defrosting operation to be equal to the upper limit frequency fmh in the heating operation. That is, the upper limit frequency of the compressor 11 in the defrosting operation is equal to the upper limit frequency fmh in the heating operation, and is changed to be lower than the upper limit frequency fmod in the simultaneous heating and defrosting operation. Moreover, when causing the defrosting operation to be performed, the operation control unit 501 initializes the counter and sets the number of times N the simultaneous heating and defrosting operation is performed to zero. After the defrosting operation ends, the process returns to the process of step S1, and the operation control unit 501 restarts the heating operation.

As described above, in Embodiment 1, the heating performance of the indoor heat exchanger 13 can be improved by setting the upper limit frequency fmod of the compressor 11 in the simultaneous heating and defrosting operation to a value higher than the upper limit frequency fmh of the compressor 11 in the heating operation. As a result, in the simultaneous heating and defrosting operation, the comfort for the user of the indoor unit can be maintained. In the configuration of Embodiment 1, the upper limit frequency of the compressor 11 is increased within a range in which the input W to the compressor 11 is not increased. It is therefore possible to reduce an increase in electricity consumption.

Even in a situation in which the heating load is heavy and the operation frequency of the compressor 11 is likely to reach its upper limit frequency, it is possible to promptly raise the upper limit frequency and continue the operation, since the upper limit frequency of the compressor 11 is changed to the upper limit frequency fmod on only the condition that the simultaneous heating and defrosting operation is to be started. It should be noted that as a condition required to change the upper limit frequency of the compressor 11 to the upper limit frequency fmod, a condition other than the condition that the simultaneous heating and defrosting operation is to be started may be added.

The above description is made as a description concerning Embodiment 1, but it is not limiting. That is, various modifications can be made without departing from the gist of the present disclosure. For example, regarding Embodiment 1, it is described that the flow passages to the first outdoor heat exchanger 15a and the second outdoor heat exchanger 15b are switched using the second flow switch valve 21a and the third flow switch valve 21b; however, the description is not limiting. The flow passages to the first outdoor heat exchanger 15a and the second outdoor heat exchanger 15b may be switched using, for example, a single flow switch valve instead of the two flow switch valves. In this case, the flow switch valve is a four-way valve.

Moreover, in Embodiment 1, it is described above that the upper limit frequency fmod of the compressor 11 in the simultaneous heating and defrosting operation is 1.2 times higher than the upper limit frequency fmh of the compressor 11 in the heating operation; however, it is not limiting. For example, the upper limit frequency fmod of the compressor 11 in the simultaneous heating and defrosting operation may be set to a value corresponding to the temperature difference $\Delta$deg between the evaporating temperature of the outdoor heat exchanger and the outside-air temperature.

For example, when the outside-air temperature is 2 degrees C. and refrigerant to be used is R32, the gas density of refrigerant saturated gas in the case where the temperature difference $\Delta$deg is 10 deg is 16.98 kg/m$^3$, and the gas density of refrigerant saturated gas in the case where the temperature difference $\Delta$deg is 20 deg is 12.00 kg/m$^3$. Thus, the speed multiplying factor of the compressor 11 is 1/0.7 and is approximately 1.4. That is, when the temperature difference $\Delta$deg is 10 deg, the upper limit frequency fmod of the compressor 11 in the simultaneous heating and defrosting operation may be set, at maximum, 1.4 times higher than the upper limit frequency fmh in the heating operation.

Moreover, the multiplication factor is not limited to the above value, and it suffices that the upper limit frequency fmod in the simultaneous heating and defrosting operation in the case where the temperature difference $\Delta$deg is great is set higher than the upper limit frequency fmod in the case where the temperature difference $\Delta$deg is small. The controller 50 may store upper limit frequencies fmod of the compressor 11 in the simultaneous heating and defrosting operation that correspond to temperature differences $\Delta$deg in advance in the storage unit 503, and read out an upper limit frequency fmod corresponding to the temperature difference $\Delta$deg based on the temperature difference $\Delta$deg obtained when the simultaneous heating and defrosting operation is performed.

Furthermore, in Embodiment 1, the above description is also made with respect to changing of the upper limit frequency fmod of the compressor 11 in the simultaneous heating and defrosting operation in the case where the performance of the first outdoor heat exchanger 15a is equivalent to that of the second outdoor heat exchanger 15b; however, the present disclosure can also be applied to the case where the performance of the first outdoor heat exchanger 15a is different from that of the second outdoor heat exchanger 15b. In this case, the upper limit frequency fmod of the compressor 11 in the simultaneous heating and defrosting operation may be changed depending on the performance ratio between the first outdoor heat exchanger 15a and the second outdoor heat exchanger 15b, such that the upper limit frequency fmod of the compressor 11 in the simultaneous heating and defrosting operation in the first operation is different from that in the second operation. Furthermore, regarding Embodiment 1, the above description also refers to the upper limit frequency fmod of the compressor 11 in the case where the outdoor heat exchanger is divided into two portions; however, the present disclosure can also be applied to the case where the outdoor heat exchanger is divided into three or more portions. In this case, the upper limit frequency fmod of the compressor 11 in the simultaneous heating and defrosting operation may be changed depending on the number of the divided portions of the outdoor heat exchanger.

REFERENCE SIGNS LIST

1: refrigeration cycle apparatus, 10: refrigerant circuit, 11: compressor, 11a: suction port, 11b: discharge port, 12: first flow switch valve, 13: indoor heat exchanger, 14: expansion valve, 15a: first outdoor heat exchanger, 15b: second outdoor heat exchanger, 17a, 17b: capillary tube, 18: bypass expansion valve, 21a: second flow switch valve, 21b: third flow switch valve, 22: check valve, 50: controller, 61: discharge pipe, 62: suction pipe, 63, 65, 68, 69, 71, 84: bifurcation, 64: second high pressure pipe, 67, 67a, 67b: first high pressure pipe, 70, 70a, 70b: low pressure pipe, 80, 81, 82, 82a, 82b, 83a, 83b: refrigerant pipe, 91: outside-air temperature sensor, 92a, 92b: heat-exchanger temperature sensor, 501: operation control unit, 502: upper limit frequency change unit, 503: storage unit.

The invention claimed is:

1. A refrigeration cycle apparatus comprising:
a compressor;
an indoor heat exchanger;
an outdoor heat exchanger including a first outdoor heat exchanger and a second outdoor heat exchanger;
a bypass flow passage configured to cause a discharge side of the compressor to communicate with the first outdoor heat exchanger or the second outdoor heat exchanger;
a flow control valve provided at the bypass flow passage; and
a controller configured to perform a heating operation and a simultaneous heating and defrosting operation, the heating operation being an operation in which the first outdoor heat exchanger and the second outdoor heat exchanger are each caused to operate as an evaporator and the indoor heat exchanger is caused to operate as a condenser, the simultaneous heating and defrosting operation being an operation in which part of refrigerant discharged from the compressor is supplied to one of the first outdoor heat exchanger and the second outdoor heat exchanger through the bypass flow passage, the other of the first outdoor heat exchanger and the second outdoor heat exchanger is caused to operate as an evaporator, and the indoor heat exchanger is caused to operate as a condenser,
wherein the controller is configured to change, when the simultaneous heating and defrosting operation is performed, an upper limit frequency of the compressor to a value higher than the upper limit frequency of the compressor in the heating operation,
wherein the upper limit frequency of the compressor is an upper limit value of an operation frequency range of the compressor.

2. The refrigeration cycle apparatus of claim 1, wherein the controller is configured to perform a defrosting operation in which the first outdoor heat exchanger and the second outdoor heat exchanger are each caused to operate as a condenser and the indoor heat exchanger is caused to operate as an evaporator, and
the controller is configured to set an operation frequency of the compressor in the defrosting operation such that the operation frequency of the compressor in the defrosting operation is equal to the upper limit frequency of the compressor in the heating operation.

3. The refrigeration cycle apparatus of claim 1, wherein the controller is configured to set the upper limit frequency of the compressor in the simultaneous heating and defrosting operation to a value corresponding to a temperature difference in the heating operation between an evaporating temperature at the outdoor heat exchanger and an outside-air temperature.

4. The refrigeration cycle apparatus of claim 3, wherein the controller is configured to set the upper limit frequency of the compressor in the simultaneous heating and defrosting operation in a case where the temperature difference is greater to a value higher than the upper limit frequency of the compressor in the simultaneous heating and defrosting operation in a case where the temperature difference is smaller.

5. The refrigeration cycle apparatus of claim 3, wherein the controller is configured to set the upper limit frequency of the compressor in the simultaneous heating and defrosting operation such that the upper limit frequency of the compressor in the simultaneous heating and defrosting operation is, at maximum, 1.2 times or 1.4 times higher than the upper limit frequency of the compressor in the heating operation.

6. The refrigeration cycle apparatus of claim 1, further comprising a flow switch valve configured to connect the bypass flow passage to a selected one of the first outdoor heat exchanger and the second outdoor heat exchanger,
wherein the controller is configured to change, when the simultaneous heating and defrosting operation is performed, the upper limit frequency of the compressor after performing a switching operation of the flow switch valve.

* * * * *